United States Patent [19]

Reilly

[11] 4,398,917
[45] Aug. 16, 1983

[54] PROCESS FOR THE PREPARATION OF FUEL PELLETS

[76] Inventor: Charles J. Reilly, 777 E. 31st St., Brooklyn, N.Y. 11210

[21] Appl. No.: 360,991

[22] Filed: Mar. 23, 1982

[51] Int. Cl.³ .............................................. C10L 5/02
[52] U.S. Cl. ..................... 44/10 B; 44/1 E; 264/109
[58] Field of Search ............... 44/10 B, 10 A, 10 E, 44/1 E; 106/163 R; 264/109

[56] References Cited

U.S. PATENT DOCUMENTS 3,764,475 10/1973 Mandels et al. ............... 435/105
4,236,897 12/1980 Johnston ......................... 44/10 B Primary Examiner—Delbert E. Gantz
Assistant Examiner—Anthony McFarlane

[57] ABSTRACT

A simple and efficient process is provided for the preparation of fuel pellets comprised of, in whole or in part, a modified cellulosic material.

By contacting a cellulosic material with certain enzymes, such as cellulase, the cellulose structure is modified so that the material flows more easily and therefore less energy need be expended in formation of the pellets. Hence, higher production is obtained by increased input and output to and from the pellet mill. Moreover, the pelletizing die itself is subjected to less abrasion and hence has a longer life.

21 Claims, 1 Drawing Figure

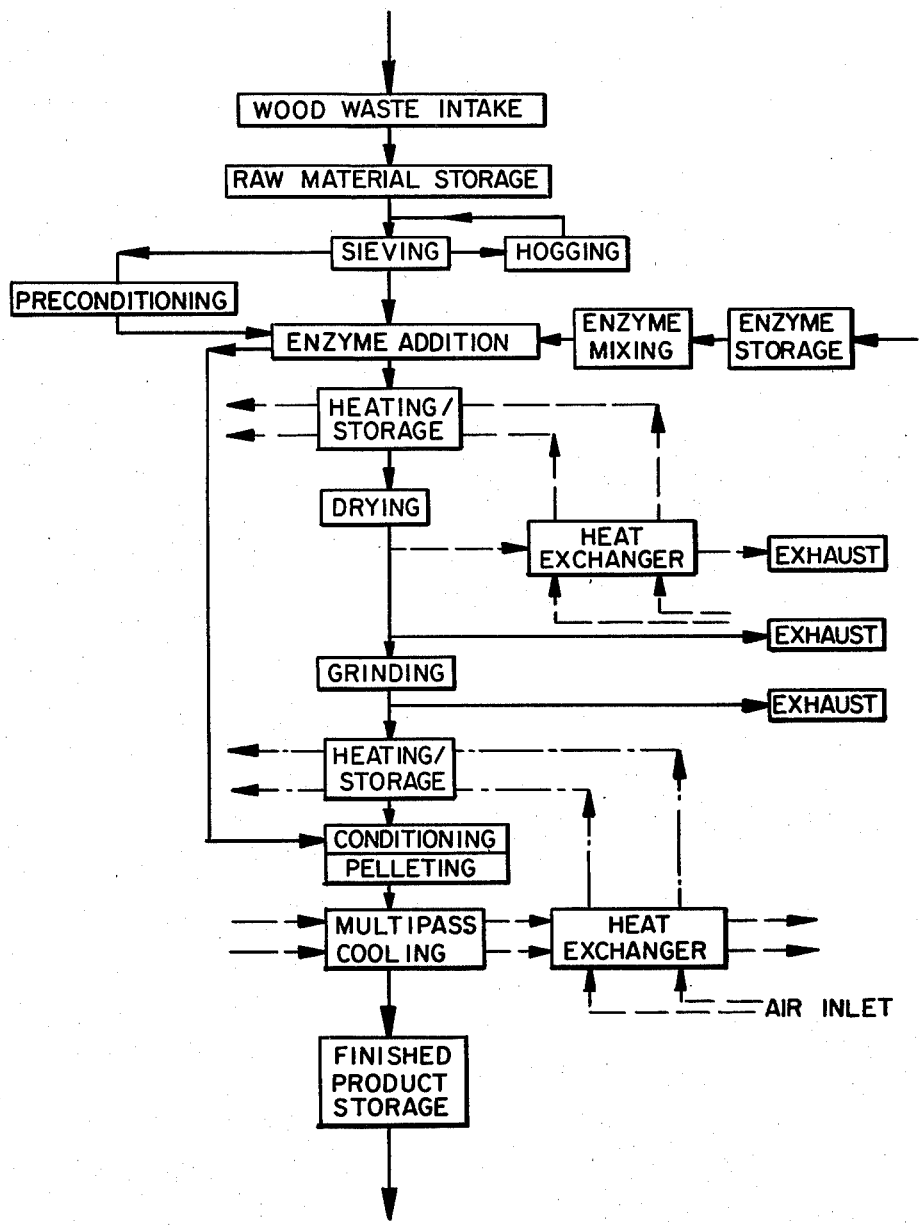

PROCESS FOR THE PREPARATION OF FUEL PELLETS

This invention relates in general to an improved process for the preparation of a compacted fuel material. In one aspect, this invention is directed to an improved process for the preparation of pellets comprised of, in whole or in part, a modified cellulosic material. In a still further aspect the invention is directed to the use of certain enzymes, such as cellulase, to effect modification of the cellulose structure whereby the material flows more easily in the pelletizing equipment and is also less abrasive to the pelletizing die. In another aspect the production rate of the pellet mill is increased by the practice of this invention.

BACKGROUND OF THE INVENTION

Prior to the present invention a variety of processes have been reported in the literature for the preparation of compacted or compressed materials for use as fuels. For example, U.S. Pat. No. 4,015,951 which issued on Apr. 5, 1977 to R. W. Gunnerman discloses a method for the preparation of pellets, adapted to be burned as fuels in industrial applications. The method, which is directed primarily to wood, is dependent upon the use of materials, which during pelletizing will exude a wax-like material at temperatures of about 325° F. and thereby form a wax-like surface over the pellet. In order to assure that a coating is formed which will impart optimum strength to the pellet, it appears that the particle size of the fibrous material and moisture content are critical.

More recently, U.S. Pat. No. 4,236,897 which issued to I. F. Johnston on Dec. 2, 1980, claims a high, heat value fuel pellet which is comprised of cellulosic material and from about 1 to about 50 percent by weight of a synthetic polymeric thermoplastic material, such as polystyrene. It is indicated in the patent that the term "synthetic thermoplastic materials" excludes naturally occurring thermoplastic materials and naturally occurring cellulosic materials. The advantages of the method are indicated to be resistance of the pellet to crumbling, easy ignition, and high heating value.

However, prior to the present invention the pelletizing of cellulosic materials such as wood wastes for use as a fuel was a very costly operation. This was due to the extremely shortened die life of the pelletizing equipment caused by the excessive abrasiveness of the wood being processed through the die and hence the overall rate of production was low. This problem was a very costly one and to date has largely prevented the preparation of pellets at prices which could be competitive with other compacted fuel systems.

Moreover, prior to the present invention nothing has been reported in the literature of attempts to reduce the abrasiveness of the cellulosic material, such as wood by modification of the cellulose itself, whereby the life of the pelletizing die would be extended, and the production increased.

Accordingly, one or more of the following objects will be achieved by the practice of this invention. It is an object of this invention to provide an improved process for the preparation of fuel pellets. Another object of this invention is to provide a process for the preparation of fuel which is simple and efficient and less costly than known methods. A still further object of the invention is to provide a process for the preparation of fuel pellets which are derived in part from cellulosic materials. Another object is to provide a process which utilizes certain enzymes to modify the cellulose. A further object of this invention is to provide a process wherein the modified cellulose will flow easily into the pelleting press and bond together in the die without the use of excessive mechanical power. A still further object is to provide a process for reducing the abrasive properties of materials such as wood, so that the overall life of the pelletizing die is greatly extended. These and other objects will readily become apparent to those skilled in the art in the light of the teachings herein set forth.

SUMMARY OF THE INVENTION

In its broad aspect the invention relates to an improved process for the preparation of fuel pellets. The process comprises the steps of:

(a) contacting a communated cellulosic material with at least one enzyme under conditions whereby the cellulosic material is modified to the extent that less energy need be expended to form pellets, as opposed to non-modified material, and the life of the pelletizing die is extended, (b) partially drying and communating said modified material, (c) pelletizing said modified material, and (d) drying the resulting pellets to further reduce the moisture content.

DESCRIPTION OF THE DRAWING

The aforementioned objects and other features of the invention will become more readily apparent from the detailed description and accompanying drawing.

The single drawing is a flow diagram depictint one possible embodiment of the invention wherein a cellulosic material, in this case, wood waste, is subjected to size reduction (i.e. hogging) and sieving to remove non-combustible materials. The material can then be preconditioned, if desired, and contacted with the enzyme for cellulose modification. Heating, drying and further communating may be necessary prior to pelletizing. Depending upon the moisture content of the modified material further conditioning, such as steam treatment might be desired prior to the actual pelletizing operation. The finished pellets are then dried and cooled if necessary to achieve the desired moisture content.

DETAILED DESCRIPTION OF THE INVENTION

The present invention provides a simple and convenient process wherein the cellusose is modified and rendered more pliable and soft and hence will flow easily into the pelletizing press and hence can be processed without the use of excessive mechanical power. Moreover, the cellulose particles are less abrasive than the unmodified material and the life of the die is extended. These features result in increased pellet press capacity, extension of the life of the die, improved pellet quality, and an increase in the production rate.

It is important to note that in the present invention it is not necessary to hydrolyze of cellulosic material to the simple sugars as is done in ethanol synthesis. All that is necessary is to modify the material with the enzyme so that it is softer and less abrasive than the unmodified material.

Thus, by the term "modified cellulose" as used throughout this specification and appended claims, is meant a reaction of the enzyme and the cellulose which proceeds only to the extent that the cellulosic structure is softened and made more pliable. In contrast to the prior art teachings for the synthesis of sugars and alcohols from cellulose, the present process does not involve an extended hydrolysis or breakdown of the cellulose molecule. Hence, it should be appreciated that the purpose of modifying the cellulosic structure is to achieve improved mechanical properties rather than to obtain chemical and/or biological by-products of cellulose itself.

As indicated above, the process is directed to the preparation of fuel pellets which are derived in whole or in part, from at least one cellulosic material. The only requirement for the cellulosic material is that it can be softened by certain enzymes as hereinafter described. For example, the cellulosic material can be paper, sawdust, wood, wood chips, wood wastes, peat, bark, urban or municipal waste principally in the form of paper or paper derivatives, and the like. As indicated, the cellulosic material can also be used by itself or in conjunction with other materials which are combustible such as coal fines or other materials known in the art which will aid in binding the pellet components together.

As previously indicated, the process of this invention is applicable to a wide variety of products comprised of, in part, at least one cellulosic material. The process is particularly applicable to municipal and industrial wastes which contain cellulosic materials. In practice, the material whether all cellulose, such as wood chips, or only partially cellulose, such as municipal wastes, is separated from non-combustible materials, such as metal, glass, and the like, by standard separation techniques. Depending upon the moisture content of the material it might first be necessary to subject it to drying step. Preferably the moisture content of the material to be processed should not exceed 15 to 25 percent by weight. If a drying step is necessary, it can easily be accomplished by methods known in the art.

Thereafter, the material is subjected to hogging which can be effected by grinding, hammer milling and the like, to communute the material to the desired particle size. The actual particle size can vary widely depending upon the pelleting equipment being employed, the rate of production desired, and other considerations. For most practical purposes, it is preferred that the particle size for wood be less than about three quarters of an inch. For municipal wastes the size can be larger and will vary depending upon a variety of factors. For some materials the particle size can be as low as about one-sixteenth of an inch.

After communating the cellulosic material it is sieved to provide essentially uniform size particles. At this stage, depending again upon the material being pelletized, it may be desirable to precondition it before the material is contacted with the enzyme. Although good results are obtained by use of the enzyme treatment step alone, it has been observed that optimum modification of the cellulosic material is achieved in the shortest time when the material is subjected to preconditioning. Preconditioning causes the cellular structure of the raw stock to swell and renders it more reactive with the enzyme. Lignins and other components are solubilized to a degree by the preconditioning and could be removed if desired. However, for the purpose of this invention the entire modified material is used without separation of any of the cellulosic components.

In practice, if the cellulose content or lignin content of the material is very high, then preconditioning is usually desirable. Preconditioning can be effected by a variety of means, such as acid, treatment, alkali treatment, steam treatment and the like. In the process of this invention it has been observed that good preconditioning results are achieved by treatment of the cellulosic material with a base. Illustrative alkalies which can be employed include, but are not limited to, sodium hydroxide, potassium hydroxide, lithium hydroxide, ammonium hydroxide, calcium carbonate, sodium carbonate, and the like.

The preconditioning can be effected by spraying the communated material with an aqueous sodium hydroxide solution having a concentration of from about 0.01 to about 10 weight percent. The amount of solution used need only be enough to moisten or wet the surface to insure at least some swelling of the cellulose. Although, spraying is preferred, in some instances, for example wood chips, the material can be slurried in the alkali solution for a short period of time and then drained.

The next step is the modification of the cellulosic structure by means of the enzyme. As with the preconditioning step, a solution of the enzyme, such as cellulase, can be sprayed onto the material or the communated material can be slurried in the enzyme solution. Inasmuch as the enzymes are not inexpensive, it is preferred to optimize their method of use and spraying is believed to give the best results for economic considerations. The actual concentration of the enzyme in solution will, of course, vary depending upon the particular material being pelletized, its cellulose content and other considerations.

In general, the enzyme is employed as an aqueous solution containing from about 0.005 to about 0.5 weight percent and more preferably, from about 0.05 to about 0.1 weight percent enzyme. Application of the enzyme solution by spray techniques rate of from about 1 to about 2 pounds of enzyme per ton of cellulosic material has been found to give excellent results. Amounts above and below these figures can be employed and will largely depend upon economic and other considerations.

The reaction time for the enzyme to soften the cellulose will, of course vary depending upon a variety of factors, such as enzyme concentration, temperature, preconditioning, cellulose content of material, and the like. In practice, however, it has been found that reaction times of from 0.5 hours to about 8 hours give satisfactory results.

The enzymes which have been found to be particularly suitable for use in the process of this invention are those described in U.S. Pat. No. 3,764,475 which issued on Oct. 9, 1973 to M. H. Mandels and J. A. Kostick and which is assigned to the United States government. As indicated in the patent, several microorganisms in nature, mostly fungi, are capable of elaborating a complex enzyme system which is responsible for hydrolyzing cellulose into simple sugars. The enzyme complex includes endo and exo glucanases which hydrolyze the glucosidic links and a pre-hydrolysis factor ($C_1$) that permits the glucanases to act on insoluble cellulose. Among the microorganisms, the fungus *Trichoderma viride* has been found to be, thus far, the most useful, in that it produces the highest levels of a stable cellulase capable of total hydrolysis of insoluble cellulose, i.e., it is rich in the pre-hydrolysis factor ($C_1$). The preferred strain for the production of cellulase is *Trichoderma viride* (Tv) mutant QM 9123 produced by the irradiation of the patent strain (Tv QM 6a) with high energy electron beam from a linear accelerator, Mandels, Weber, Parizek, Applied Microbiology, 21, pages 152–154, 1971.

Again, depending upon the means of application of the enzyme, physical structure of the communated material, it may be necessary to dry the material and subject it to a further hogging. For example, if the material is largely waste paper, the communated particles may mat together during the pretreatment and enzyme modification steps and drying and a second communation might be dictated.

The modified material is then ready for pelletizing. If the material is to be stored for any length of time before pelletizing, it might be necessary to stop the action of the enzyme so that the material does not become unduly soft through hydrolysis. This can be accomplished by several means, such as, for example, the use of a very low concentration of enzyme in the solution; heat, or other chemical treatment. Normally, the action of the enzyme will cease after pelletizing.

As indicated previously, pelletizing can be effected by use of several types of equipment presently on the market. For example, the Paladin Pellet Mills sold by the Simon-Barron Company, having an office in Kansas City, Mo., is particulary well suited for use with the process.

Pellets prepared by the process of this invention will have a density of about 35 pounds per cubic foot as opposed to a density of about 5 pounds per cubic foot for the material prior to pelletizing. Moreover, before pelletizing the cellulosic material will have a calorific value of about 4500 BTU per pound, as opposed to about 7500 BTU's per pound after pelletizing. The product can also be further upgraded by the addition of other products such as coal fines to the cellulosic material and result in a product having a calorific value of up to 11,000 BTU's per pound, and higher. The coal fines or other combustible material when employed can be present in ratios of coal fines to cellulosic material of from about 1:3 to about 3:1.

Although the invention has been illustrated by the preceding description, it is not to be construed as being limited to the materials employed therein, but rather the invention is directed to the generic area as hereinbefore disclosed. Various modifications and embodiments thereof can be made without departing from the spirit and scope thereof.

The pellets produced by the process of this invention are useful for burning in the home, or in commercial or industrial boilers or furnaces.

What is claimed is:

1. A process for the preparation of fuel pellets comprised of, in whole or in part, at least one modified cellulosic material which process comprises the steps of:
   (a) contacting a communated cellulosic material with at least one enzyme under conditions whereby said cellulosic material is modified to the extent that it is softer and more pliable and less mechanical energy is needed to form the material into said pellets,
   (b) partially drying and communating said modified material,
   (c) pelletizing said modified material and
   (d) drying the resulting pellets to further reduce the moisture content.

2. The process of claim 1 wherein said enzyme is cellulase.

3. The process of claim 1 wherein said enzyme is a complex comprised of endo and exo glucanases.

4. The process of claim 1 wherein said enzyme is comprised of endo and exo glucanases and a pre-hydrolysis factor ($C_1$).

5. The process of claim 1 wherein said enzyme is cellulase derived from *Trichoderma viride* microorganism.

6. The process of claim 1 wherein said cellulosic material is wood.

7. The process of claim 6 wherein said wood is in the form of wood chips.

8. The process of claim 1 wherein the cellulosic material is subjected to a preconditioning to partially swell the cellulose molecules.

9. The process of claim 8 wherein the preconditioning is effected by contacting the cellulosic material with a base.

10. The process of claim 8 wherein the preconditioning is effected by contacting the cellulosic material with an acid.

11. The process of claim 9 wherein said base is sodium hydroxide.

12. The process of claim 9 wherein said base is potassium hydroxide.

13. The process of claim 9 wherein said base is ammonium hydroxide.

14. The process of claim 9 wherein the preconditioning is effected by contacting the cellulosic material with an aqueous sodium hydroxide solution having a concentration of from about 0.01 to about 10 weight percent.

15. The process of claim 1 wherein at least one of said enzymes is cellulase and contacting of the cellulosic material is achieved by spraying the cellulosic material with an aqueous solution of said cellulose.

16. The process of claim 15 wherein said cellulase is employed as an aqueous solution having a concentration of from about 0.05 to about 0.1 weight percent.

17. The process of claim 1 wherein said fuel pellets are comprised of, in part, communated coal.

18. The process of claim 17 wherein said communated coal is coal fines.

19. The process of claim 18 wherein the ratio of said coal fines to said cellulosic material is from about 1:3 to about 3:1.

20. A process for the preparation of fuel pellets comprised of in whole or in part, at least one modified cellulosic material which process comprises the steps of:
   (a) spraying a communated cellulosic material with an aqueous solution containing from about 0.05 to about 0.1 weight percent of cellulase,
   (b) partially drying and communating the sprayed cellulosic material,
   (c) pelletizing the cellulosic material and
   (d) drying the resulting pellets to further reduce the moisture content.

21. The fuel pellet prepared by the process of claim 20.

* * * * *